United States Patent
Chen

[19]

[11] Patent Number: 6,126,242
[45] Date of Patent: Oct. 3, 2000

[54] BICYCLE WHEEL RIM WITH INTEGRALLY FORMED BRAKING PLATE

[75] Inventor: Chao-Ying Chen, Tainan Hsien, Taiwan

[73] Assignee: Alex Machine Industrial Co., Ltd., Tainan Hsien, Taiwan

[21] Appl. No.: 09/407,683

[22] Filed: Sep. 28, 1999

[51] Int. Cl.⁷ .................................................. B60B 21/08
[52] U.S. Cl. .................. 301/6.7; 301/95; 188/26
[58] Field of Search .............. 301/6.1, 6.7, 6.8, 301/95, 96, 97, 98; 188/26

[56] References Cited

U.S. PATENT DOCUMENTS

| | | | |
|---|---|---|---|
| 1,826,617 | 10/1931 | Kuiper | 301/6.7 X |
| 1,870,289 | 8/1932 | Johnson | 301/6.7 X |
| 4,662,482 | 5/1987 | Bass | 301/6.7 X |
| 4,716,993 | 1/1988 | Bass | 188/26 X |

*Primary Examiner*—Russell D. Stormer
*Attorney, Agent, or Firm*—Townsend and Townsend and Crew LLP

[57] ABSTRACT

A bicycle wheel rim includes a rim body and a braking plate. The rim body includes annular first and second tire retaining walls adapted for retaining a bicycle tire therebetween, and a spoke mounting portion. Each of the tire retaining walls has a radial inner edge proximate to an axis of the wheel rim, a radial outer edge adapted for retaining the bicycle tire therebetween, and a lateral outer surface opposite to the other one of the tire retaining walls. The rim body further includes an annular spoke mounting portion which interconnects the radial inner edges of the tire retaining walls and which is adapted for mounting spokes thereon. The braking plate projects integrally from the lateral outer surface of the first tire retaining wall, and has two opposite brake pad contacting surfaces adapted to be contacted by brake pads of a brake device.

5 Claims, 5 Drawing Sheets

BICYCLE WHEEL RIM WITH INTEGRALLY FORMED BRAKING PLATE

BACKGROUND OF THE INVENTION

1. Field of the Invention

The invention relates to a bicycle wheel rim, more particularly to a bicycle wheel rim having a braking plate projecting integrally from a main rim body of the wheel rim to be contacted by brake pads of a brake device in order to prevent deformation of the main rim body due to frequent braking while maintaining a relatively good braking effect.

2. Description of the Related Art

FIG. 1 illustrates a conventional bicycle wheel with a wheel rim 1 which includes a pair of spaced-apart tire retaining walls 12 adapted for retaining a bicycle tire 10 therebetween, and an annular spoke mounting wall 11 interconnecting radial inner edges of the tire retaining walls 12. The spoke mounting wall 11 is adapted for mounting a plurality of spokes 13 thereon so as to mount the wheel rim 1 on a hub 14 to form a bicycle wheel. The bicycle wheel is then mounted on a front/rear fork 16 of a bicycle frame by means of an axle 15 extending through the hub 14. The tire retaining walls 12 have brake pad contacting surfaces 121 at opposite lateral outer sides thereof to be contacted by brake pads 17 of a caliper brake device. When the brake device is operated while the bicycle wheel is in motion, the wheel rim 1 is clamped by the brake pads 17 at the tire retaining walls 12 to resist movement of the bicycle wheel. Therefore, after the bicycle wheel is in use for a period of time, the wheel rim 1 is susceptible to deformation due to frequent clamping by the brake pads 17, and might be worn by the brake pads 17, thereby reducing the strength of the wheel rim 1.

To solve the aforementioned problems, a disk brake has been proposed in the art. Referring to FIG. 2, a disk brake 21 is mounted on a lateral side of the hub 14 by means of screw bolts 20 such that the disk brake 21 is co-rotatable with the bicycle wheel. A brake device 22 is mounted on the front/rear fork 16 for contacting the disk brake 21. When the brake device 22 is operated, the disk brake 21 is clamped tightly by two brake pads 23 of the brake device 22. However, since the radial distance between the brake pads 23 and the axle 15 is much smaller that the radial distance between the tire retaining walls 12 and the axle 15, the torque generated by the brake pads 23 when clamping on the disk brake 21 is smaller than that when the brake pads clamp the tire retaining walls 12. Thus, the braking effect achieved when the disk brake 21 is in use is unsatisfactory.

SUMMARY OF THE INVENTION

Therefore, the main object of the present invention is to provide a bicycle wheel rim which can be prevented from deformation due to frequent contact with a brake device while maintaining a relatively good braking effect.

Accordingly, the bicycle wheel rim of the present invention includes a rim body and a braking plate. The rim body includes annular first and second tire retaining walls adapted for retaining a bicycle tire therebetween, and a spoke mounting portion. Each of the tire retaining walls has a radial inner edge proximate to an axis of the wheel rim, a radial outer edge adapted for retaining the bicycle tire therebetween, and a lateral outer surface opposite to the other one of the tire retaining walls. The rim body further includes an annular spoke mounting portion which interconnects the radial inner edges of the tire retaining walls and which is adapted for mounting spokes thereon. The braking plate projects integrally from the lateral outer surface of the first tire retaining wall, and has two opposite brake pad contacting surfaces adapted to be contacted by brake pads of a brake device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
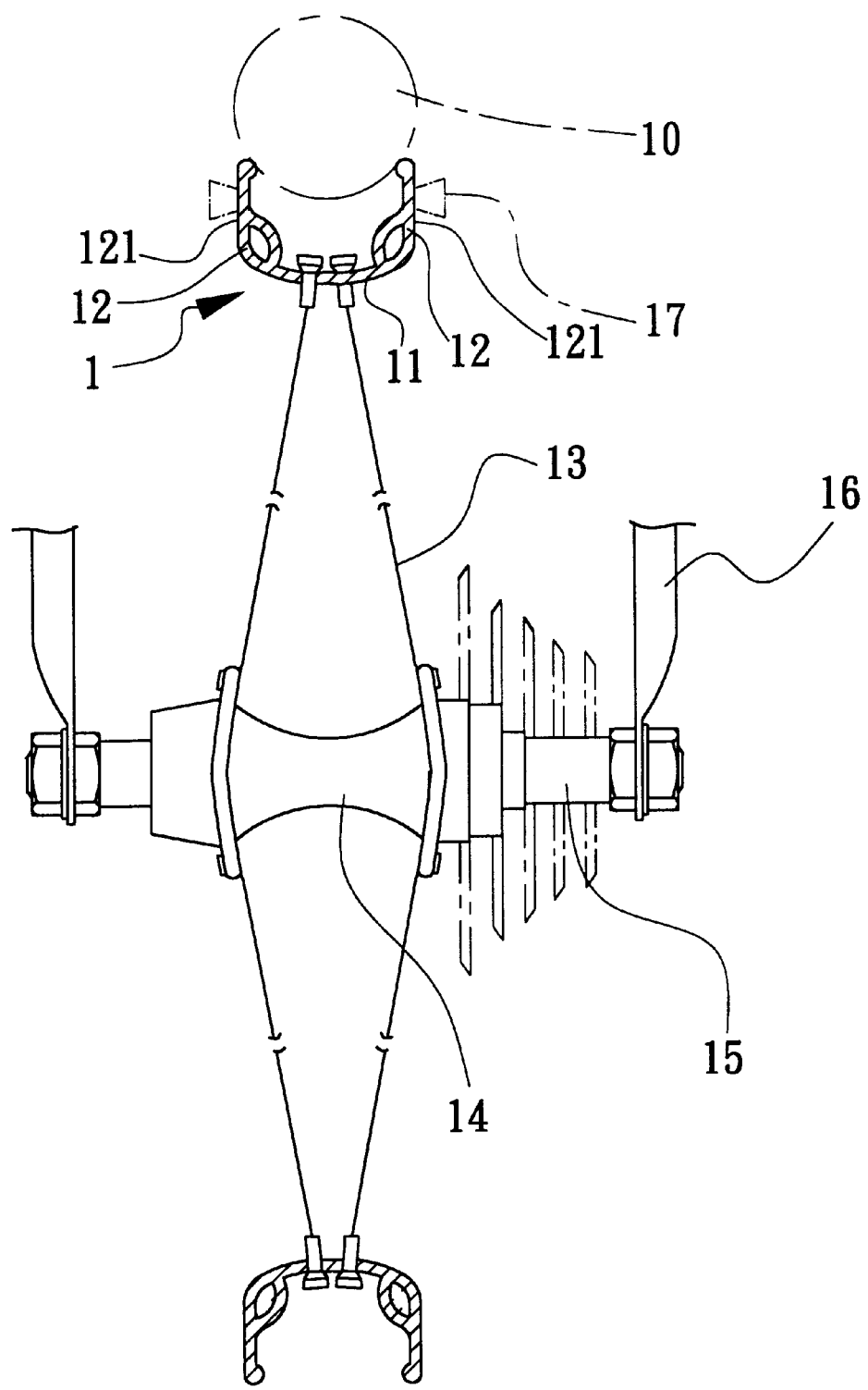
FIG. 1 is a schematic partly sectional view illustrating a bicycle wheel that incorporates a conventional bicycle wheel rim.
Figure 2:
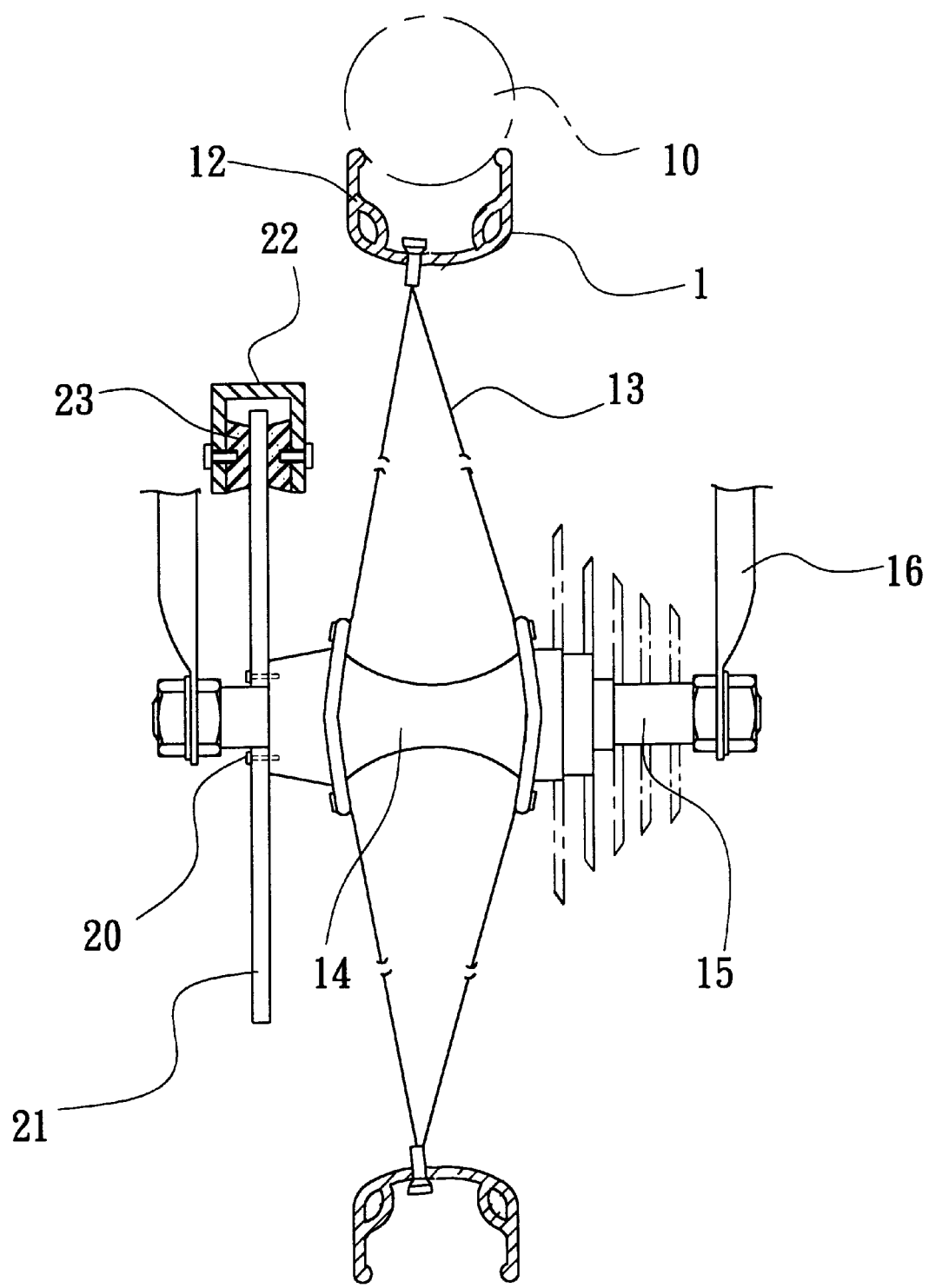
FIG. 2 is a schematic partly sectional view illustrating a conventional bicycle wheel that is used with a brake disk.
Figure 3:
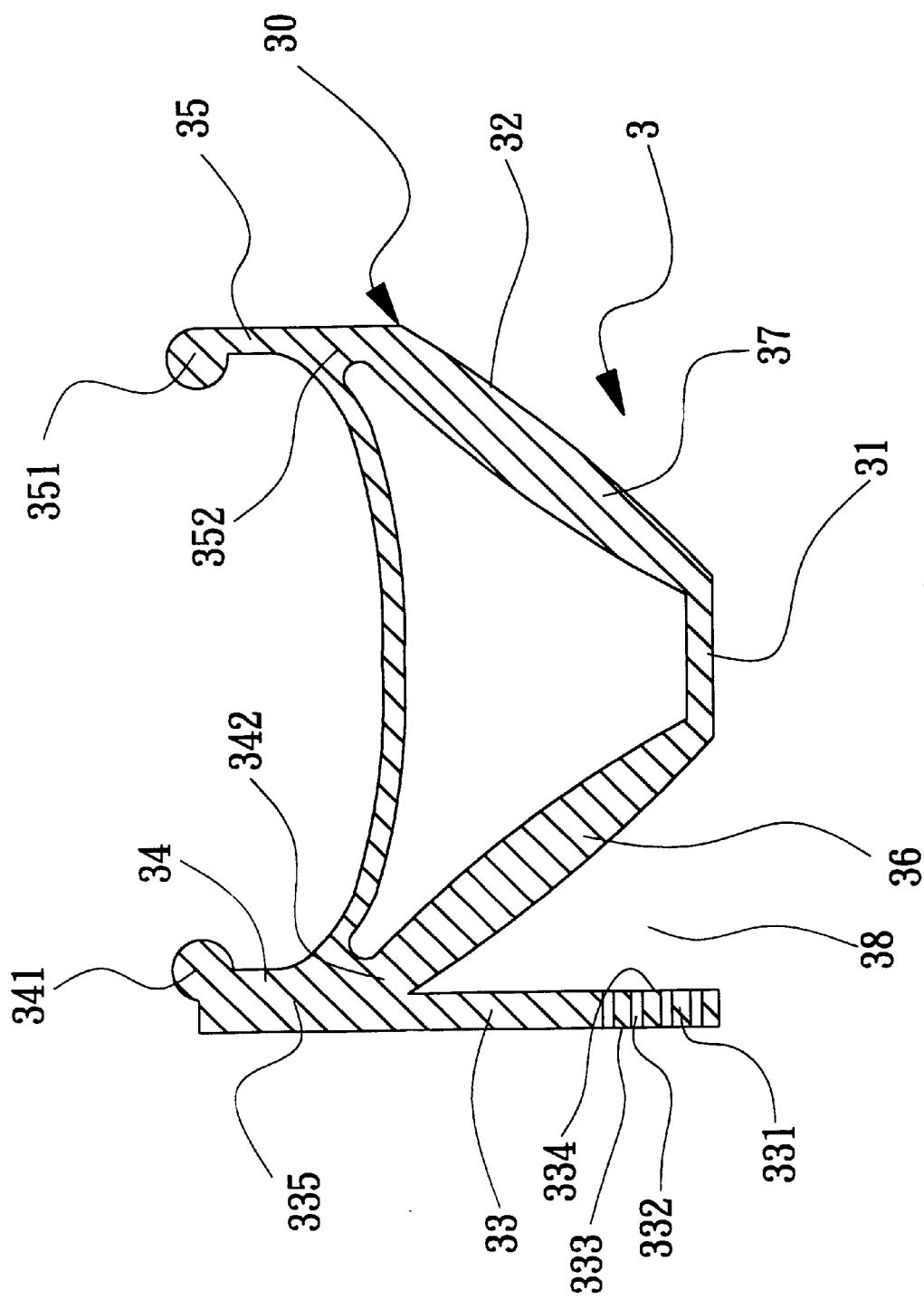
FIG. 3 is a fragmentary sectional view illustrating a first preferred embodiment of a bicycle wheel rim of the present invention.
Figure 4:
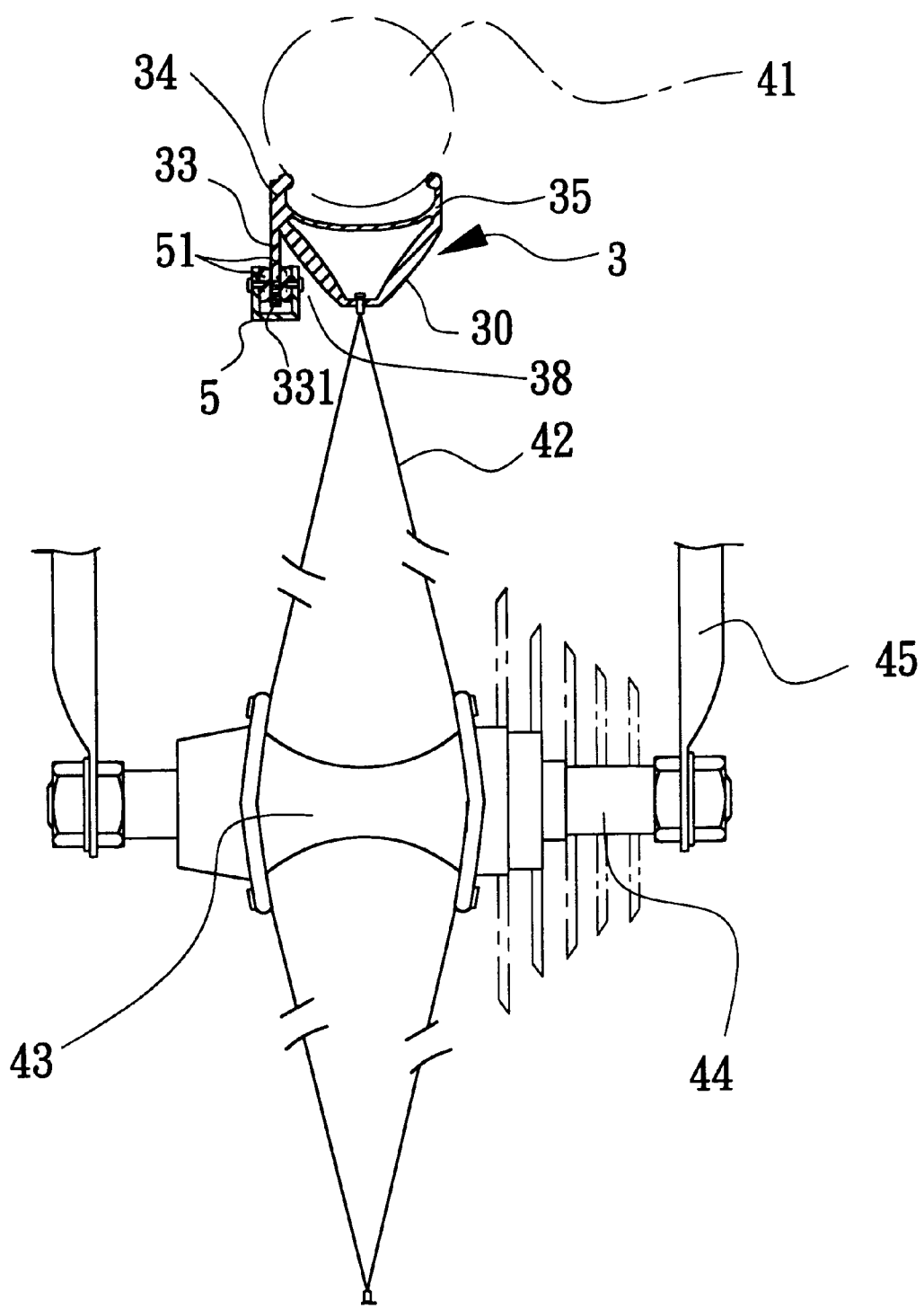
FIG. 4 is a schematic partly sectional view illustrating a bicycle wheel that incorporates the bicycle wheel rim of the first preferred embodiment and a conventional brake device.

Referring to FIGS. 3 and 4, the preferred embodiment of the bicycle wheel rim 3 of the present invention is shown to include a main rim body 30, and a braking plate 33 formed integrally with the main rim body 30. The main rim body 30 includes annular first and second tire retaining walls 34, 35 spaced apart from each other, and an annular spoke mounting portion 32 disposed radially inward of the tire retaining walls 34, 35. The tire retaining walls 34, 35 have radial outer edges 341, 351 adapted for retaining a bicycle tire 41 therebetween, and radial inner edges 342, 352 which are interconnected by the spoke mounting portion 32. The spoke mounting portion 32 includes first and second inclined walls 36, 37 which extend respectively from the radial inner edges 342, 352 of the first and second tire retaining walls 34, 35, and a spoke mounting wall 31 interconnecting the first and second inclined walls 36, 37. The first and second inclined walls 36, 37 are inclined toward each other in a radial inward direction.

The braking plate 33 projects integrally from a lateral outer surface of the first tire retaining wall 34 opposite to the second tire retaining wall 35, and extends in a radial inward direction from the first tire retaining wall 34 toward an axis of the bicycle wheel rim 3. The braking plate 33 has a connecting end portion 335 connected integrally to the first tire retaining wall 34, and a brake pad contacting end portion 331 opposite to the connecting end portion 335. The combined thickness of the connecting end portion 335 of the braking plate 33 and the first tire retaining wall 34 in a direction parallel to the axis of the wheel rim 3 is greater than the thickness of the second tire retaining wall 35. The brake pad contacting end portion 331 has two opposite brake pad contacting surfaces 333, 334 at two opposite lateral sides thereof. The brake pad contacting end portion 331 is formed with a plurality of irregularly arranged through holes 332 for increasing traction at the brake pad contacting surfaces 333, 334. The first inclined wall 36 of the spoke mounting portion 32 forms a clearance 38 with the braking plate 33 to permit extension of a brake pad 51 of a brake device 5 into the clearance 38 and contact of the brake pad 51 with the adjacent brake pad contacting surface 334 when the brake device 5 is operated.

In use, the bicycle wheel rim 3 is mounted on a hub 43 by means of a plurality of spokes 42 so as to be installed on a front/rear fork 45 of a bicycle frame via an axle 44 that extends through the hub 43. The wheel rim 3 is installed with the bicycle tire 41 such that the bicycle tire 41 is retained between the first and second tire retaining walls 34, 35. The brake device 5 is installed on the bicycle frame such that the brake pad contacting end portion 331 of the braking plate 33 extends between the brake pads 51 of the brake device 5. When the brake device 5 is operated, the braking plate 33 is clamped by the brake pads 51 at the brake pad contacting surfaces 333, 334 in order to arrest movement of the bicycle wheel.

Accordingly, the bicycle wheel rim 3 of the present invention provides the following advantages:

(1) Since it is the braking plate 33, rather than the tire retaining walls 34, 35 of the main rim body 30, that is contacted by the brake pads 51 of the brake device 5, the main rim body 30 can be prevented from deformation and strength reduction even after a relatively long period of use.

(2) Because the distance between the brake pad contacting end portion 331 of the braking plate 33 and the axis of the wheel rim 3 is generally the same as the distance between the tire retaining walls 34, 35 and the axis of the wheel rim 3, a satisfactory braking effect can be ensured.

(3) Since the braking plate 33 is formed integrally with the main rim body 30, additional assembly steps during the manufacture of a bicycle wheel can be obviated.

Figure 5:
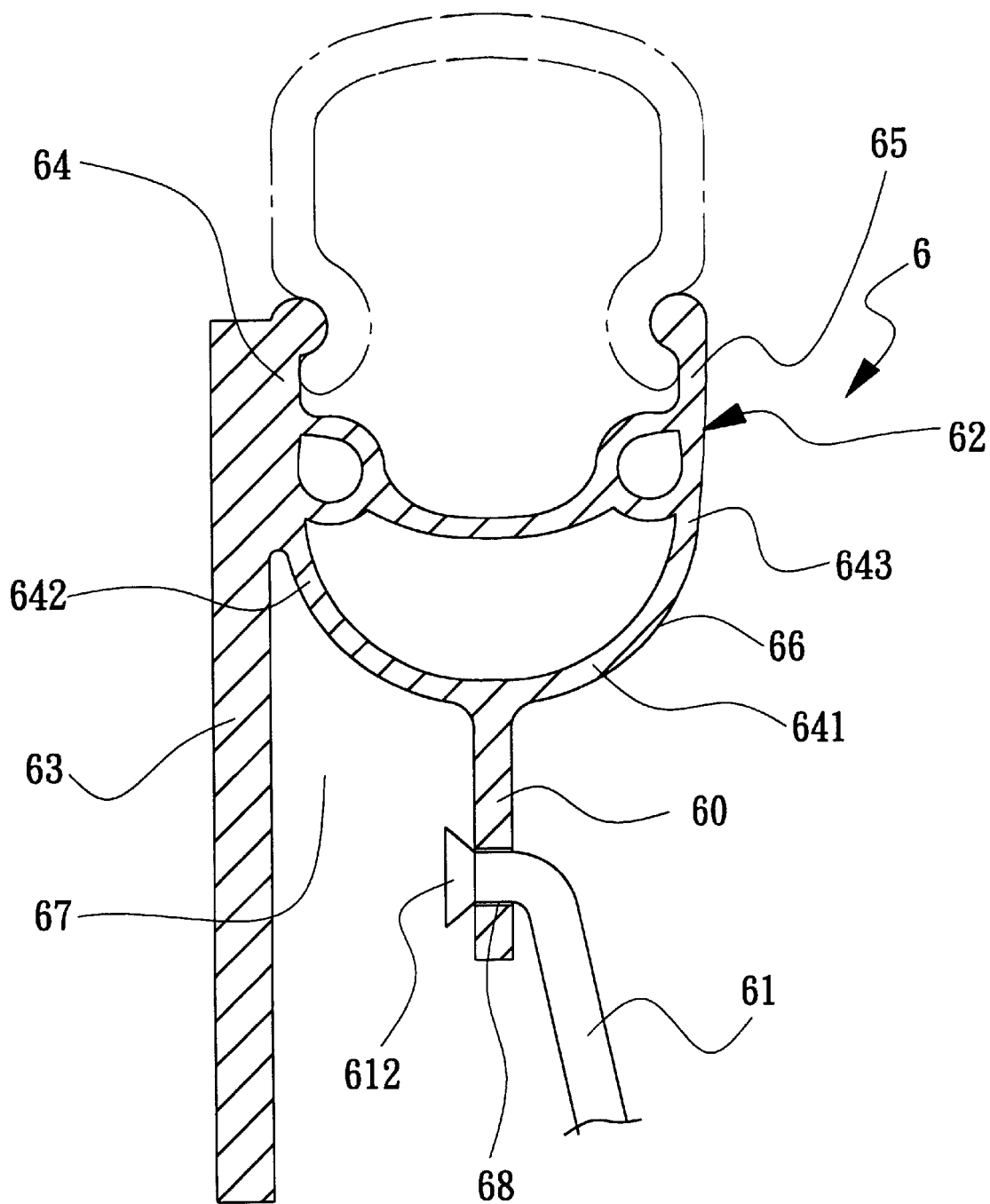
FIG. 5 is a fragmentary sectional view illustrating a second preferred embodiment of a bicycle wheel rim of the present invention.

FIG. 5 illustrates another preferred embodiment of the bicycle wheel rim 6 of the present invention. The bicycle wheel rim 6 also includes a main rim body 62, and a braking plate 63 formed integrally with the main rim body 62. The main rim body 62 includes annular first and second tire retaining walls 64, 65, and a spoke mounting portion 66 interconnecting radial inner edges of the tire retaining walls 64, 65. As with the previous embodiment, the braking plate 63 projects integrally from a lateral outer surface of the first tire retaining wall 64, and extends in a radial inward direction toward an axis of the bicycle wheel rim 6. The bicycle wheel rim 6 differs from the previous embodiment in that the spoke mounting portion 66 includes a connecting part 641 which has two opposite connecting ends 642, 643 connected respectively to the first and second tire retaining walls 64, 65, and an annular spoke mounting flange 60 which projects radially and inwardly from the connecting part 641. The connecting part 641 curves radially and inwardly, and cooperates with the spoke mounting flange 60 to provide the spoke mounting portion 66 with a generally Y-shaped cross-section. The spoke mounting flange 60 forms a clearance 67 with the braking plate 63 to permit a brake pad (not shown) of a brake device to extend into the clearance 67 and contact the braking plate 63, as with the previous embodiment. The spoke mounting flange 60 is formed with a series of spoke mounting holes 68 adapted for mounting a plurality of spokes 61 thereon. The spokes 61 have one end formed with an enlarged head portion 612 for retention at the spoke mounting flange 60, and the other end (not shown) mounted on a hub in a conventional manner.

Due to the integrally formed braking plate 33, 63 projecting from the lateral outer surface of one of the tire retaining walls 34, 64, the main rim body 30, 62 can be prevented from deformation while maintaining a relatively good braking effect.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A bicycle wheel rim comprising:

a rim body including annular first and second tire retaining walls adapted for retaining a bicycle tire therebetween, each of said tire retaining walls having a radial inner edge proximate to an axis of said wheel rim, a radial outer edge adapted for retaining the bicycle tire therebetween, and a lateral outer surface opposite to the other one of said tire retaining walls, said rim body further including an annular spoke mounting portion which interconnects said radial inner edges of said tire retaining walls and which is adapted for mounting spokes thereon; and a braking plate projecting integrally from said lateral outer surface of said first tire retaining wall, and having two opposite brake pad contacting surfaces adapted to be contacted by brake pads of a brake device.

2. The bicycle wheel rim according to claim 1, wherein said braking plate extends in a radial inward direction from said first tire retaining wall toward the axis of said wheel rim, said brake pad contacting surfaces being formed on opposite lateral sides of said braking plate.

3. The bicycle wheel rim according to claim 2, wherein said braking plate has a connecting end portion connected integrally to said lateral outer surface of said first tire retaining wall, and a brake pad contacting end portion opposite to said connecting end portion and formed with said brake pad contacting surfaces, said connecting end portion of said braking plate and said first tire retaining wall having a combined thickness in a direction parallel to the axis of said wheel rim that is greater than the thickness of said second tire retaining wall.

4. The bicycle wheel rim according to claim 2, wherein said spoke mounting portion includes first and second inclined walls which extend respectively from said radial inner edges of said first and second tire retaining walls and which are inclined toward each other in a radial inward direction, and a spoke mounting wall interconnecting said first and second inclined walls, said first inclined wall forming a clearance with said braking plate so as to be adapted to permit one of the brake pads to extend into said clearance and contact an adjacent one of said brake pad contacting surfaces.

5. The bicycle wheel rim according to claim 2, wherein said spoke mounting portion has a generally Y-shaped cross-section and includes a connecting part which curves radially and inwardly and which has two opposite connecting ends connected respectively to said radial inner edges of said first and second tire retaining walls, and an annular spoke mounting flange that projects radially and inwardly from said connecting part and that is adapted for mounting spokes thereon, said spoke mounting flange forming a clearance with said braking plate so as to be adapted to permit one of the brake pads to extend into said clearance and contact an adjacent one of said brake pad contacting surfaces.

* * * * *